(12) United States Patent
Ochiai

(10) Patent No.: US 7,540,826 B2
(45) Date of Patent: Jun. 2, 2009

(54) DRIVE ASSISTANT DEVICE FOR AUTOMOBILE

(75) Inventor: Katsuyoshi Ochiai, Katsushika-ku (JP)

(73) Assignees: I.R. Care Kabushiki Kaisha, Tokyo (JP); Konno Corporation, Tokyo (JP)

( * ) Notice: Subject to any disclaimer, the term of this patent is extended or adjusted under 35 U.S.C. 154(b) by 366 days.

(21) Appl. No.: 11/569,118

(22) PCT Filed: Dec. 5, 2005

(86) PCT No.: PCT/JP2005/022281

§ 371 (c)(1),
(2), (4) Date: Nov. 14, 2006

(87) PCT Pub. No.: WO2007/017961

PCT Pub. Date: Feb. 15, 2007

(65) Prior Publication Data

US 2008/0269015 A1 Oct. 30, 2008

(30) Foreign Application Priority Data

Aug. 11, 2005 (JP) .............................. 2005-259862

(51) Int. Cl.
*F02D 9/10* (2006.01)
(52) U.S. Cl. ................... 477/211; 477/214; 477/216
(58) Field of Classification Search .......... 477/209–217
See application file for complete search history.

(56) References Cited

U.S. PATENT DOCUMENTS 3,417,634 A * 12/1968 Dangauthier ............. 74/473.34
4,627,522 A * 12/1986 Ulrich et al. ................... 192/35
4,946,013 A * 8/1990 Conlyn et al. ............... 477/209

FOREIGN PATENT DOCUMENTS

| JP | 57182531 A | * | 11/1982 |
| JP | 10138799 A | * | 5/1998 |
| JP | 2000 127795 | | 5/2000 |
| JP | 2003252187 A | * | 9/2003 |
| JP | 2004 291950 | | 10/2004 |

* cited by examiner

*Primary Examiner*—Ha D. Ho
(74) *Attorney, Agent, or Firm*—Oblon, Spivak, McClelland, Maier & Neustadt, P.C.

(57) ABSTRACT

A brake-pedal operating rod mechanism and an accelerator-pedal operating link mechanism. The operating rod mechanism includes one end with a grip and another end with first, second and third brake rods laterally pivotally connected to a frame connected to a brake pedal bracket. The accelerator-pedal operating link mechanism includes a connecting rod longitudinally movably received in the brake rods of the brake-pedal operating rod mechanism, an accelerator-pedal operating lever pivoted by the connecting rod and extending toward an accelerator pedal, an accelerator-pedal operating link connected to an end of the operating lever away from the connecting rod and having a tip end with an accelerator pedal bracket, and a support link pivoted to the frame and to a laterally intermediate portion of the operating lever such that the link can be swung in directions in parallel with those of the operating rod mechanism.

7 Claims, 10 Drawing Sheets

DIRECTION OF MOVEMENT UPON ACCELERATING OPERATION

DIRECTION OF MOVEMENT UPON BRAKING OPERATION

DRIVE ASSISTANT DEVICE FOR AUTOMOBILE

TECHNICAL FIELD

The present invention relates to a drive assistant device for an automobile which enables a disabled person with crippled legs to easily operate in one hand accelerator and brake pedals, a blinker and the like when he/she drives the automobile.

BACKGROUND ART

When a disabled person with crippled legs drives an automobile, it is conventional that he/she uses an automobile of the type having an automatic transmission, driving operation being conducted with an assist tool adapted for one-handed operation of a steering wheel and a drive assistant device adapted for one-handed operation of accelerator and brake pedals. The drive assistant device usually comprises levers for tilting the accelerator and brake pedals through operating arms connected and levers for horizontal movement of the latter, the levers being attached beforehand to a floor or a dashboard lower portion in a driver's cab.

However, such preliminary attachment of the conventional drive assistant device to the automobile makes it difficult for a disabled person with crippled legs to use the automobile in common with able-bodied drivers. Driving schools or car rental companies in general do not hold such special drive assistant device, which fact is inconvenient for a disabled person with crippled legs. Whenever an automobile is owned by a disabled person with crippled legs, such drive assistant device has to be purchased and attached to the owned automobile. Therefore, in a case of replacement by purchase, a drive assistant device has to be also newly purchased, which is uneconomical.

In order to relieve such inconvenience and diseconomy, the inventor proposed a drive assistant device comprising units easily attachable to and detachable from a substantially flat base plate as needs demand said base plate being mounted beforehand on a floor of a driver's cab. The proposed device is disclosed in Reference 1.

A drive assistant device for an automobile disclosed in Reference 1 will be described with reference to FIGS. 1-3. FIG. 1 is a perspective view showing a driver's cab of an automobile with the drive assistant device. FIG. 2 is a partial perspective view showing a support member for a manual-operation-lever lock device as well as a rear portion of a base plate to which the lock device is fitted. FIG. 3 is a partial perspective view showing a front portion of the base plate and a chassis fitted thereto.

In FIGS. 1 and 2, reference numeral 1 designates an automobile; 2, a driver's cab in the automobile 1; 3, a floor in the cab 2; 4, a base plate arranged on the floor 3; and 5, a rotary shaft for a manual operation lever, the rotary shaft being supported by a support member 6 detachably attached to the base plate 4 as shown in FIG. 2.

The support member 6 has a bottom surface with beveled edges 6a and 6b to be clamped by fixed and movable catching members 7 and 8 on the base plate 4 for detachable attachment of the support member 6. The catching member 8 is pushed and moved by a pusher 11 which in turn is moved in the direction of arrow D1 by push-down of a lever 10 of a clamp unit 9 shown in FIG. 2, so that the edges 6a and 6b on the bottom surface of the support member 6 is clamped for attachment of the support member 6 and the rotary shaft 5 on the base plate 4.

Reference numeral 12 denotes the manual operation lever with a lower end 12a connected through support and connecting members 13 and 14 to the rotary shaft 5 so as to be pivoted in directions of arrow D2 in FIG. 1 about the shaft 5 by a hand (not shown) of a driver for the automobile 1 (see FIGS. 1 and 2).

Reference numeral 15a and 15b denotes switches respectively arranged adjacent to an upper end 12b of the lever 12 and electrically connected to at least a blinker and a horn (not shown) of the automobile 1 through cables 16a and 16b and connectors 17a and 17b so as to control the blinker and horn.

Reference numeral 18 denotes a magnet coil fixed to the connecting member 14 and electrically connected to and controlled by a switch (not shown) other than the switches 15a and 15b through a built-in cable (not shown); 19, a pawl pivotally connected by a horizontal pin to the connecting member 14 and is activated by the magnet coil 18; and 20, a ratchet fixed to the support member 6 on a side with the rotary shaft 5 and adapted to lock the manual operation lever 12 with respect to the support member 13 through engagement with the pawl 19. A manual-operation-lever lock device 21 is constituted by the magnet coil 18, the pawl 19 and the ratchet 20

In FIGS. 1 and 3, reference numeral 22 denotes a chassis formed with rectangular openings 25 and 26 into which inserted are engagement members 23 and 24 fixed to the base plate 4; and 27, a clamp member with a rectangular opening 28 and urged relative to the chassis 22 by a spring 29 in a direction reverse to the direction of arrow D3. The clamp member 27 is once manually displaced in the direction of arrow D3 into engagement with the member 24 and then release of the manual operation causes the member 27 to be urged in the direction reverse to the arrow D3 so that the members 23 and 24 are clamped from opposite sides and thus the chassis 22 is mounted on the plate 4.

In FIGS. 1 and 3, a first rotary shaft 30 extends through a side plate of the clamp member 27 and is rotatably mounted to the chassis 22. The shaft 30 has an end 30a to which a first gear 31 is connected. A brake-pedal pushing arm 32 is connected at its lower end 32a to the shaft 30 so as to be pivoted about the shaft 30 in directions of arrow D4. The pushing arm 32 has, at its portion adjacent to an upper end 32b, a brake-pedal pushing member 34 for pushing a brake pedal 33 of the automobile 1. The pushing member 34 is slidable relative to the pushing arm 32 and axially of the rotary shaft 30; alternatively, the member 34 may be constituted integral with the arm 32.

A second rotary shaft 35 extends through the side plate of the clamp member 27 and is rotatably mounted to the chassis 22. The rotary shaft 35 has an end 35a to which connected is a second gear 36 in mesh with the first gear 31 for contra-rotation of the first and second gears.

An accelerator-pedal pushing arm 37 is connected at its lower end 37a to the rotary shaft 35 so as to be pivoted about the shaft 35 in directions of arrow D4' in parallel with the directions of arrow D4. The arm 37 has, at its portion adjacent to an upper end 37b, an accelerator-pedal pushing member 39 for pushing an accelerator pedal 38 of the automobile 1. The pushing arm 37 may be slidable relative to and axially of the second rotary shaft 35; alternatively, in place of the arm 37 slidable relative to the second rotary shaft 35, the pushing member 39 may be slidable relative to the pushing arm 37 and axially of the shaft 35. The pushing member 39 may be integral with the arm 37.

Reference numeral 40 designates a pushing-force transmitting arm having one end 40a detachably and pivotally connected to the brake-pedal pushing arm 32 at an intermediate position between its upper and lower ends 32b and 32a and having the other end 40b connected to the connecting member 14 at a position adjacent to its upper end.

A drive assistant device for an automobile shown in FIGS. 1-3 according to Reference 1 may be applicable not only to usual automobiles but also to automobiles owned by driving schools or car rental companies and allows disabled persons and able-bodied drivers to easily use the automobile in common by arranging a base plate 4 on a floor 3 of a driver's cab 2 beforehand upon fabrication of the automobile. The drive assistant device according to Reference 1 is much advantageous for example in that the manual operation lever 12 can be easily locked to enhance a driver 5 safety from the viewpoint of driving operation and in that adjustment may be conducted for easy application to various automobiles different in spacing between the brake and accelerator pedals 33 and 38.

[Reference 1] JP 2000-127795A

SUMMARY OF THE INVENTION

Problems to be Solved by the Invention

However, a drive assistant device for an automobile as shown in FIGS. 1-3 is too heavy and too large for a disabled person to carry for a trip, resulting in great burden on the disabled person. On the other hand, in view of an extremely high ownership rate of automobiles with automatic transmissions nowadays, it may be said that there are now in social environment that a disabled person has enough chances to use an automobile utterly in common with able-bodied persons, providing that there were a drive assistant device for an automobile which has no need of preliminarily fitting a base plate, which can be easily carried by a disabled person, which is simple in mounting and adjustment and which can be fitted to any automobile.

In view of the above, the invention has its object to provide a drive assistant device for an automobile which has no need of installing a base plate or the like part of the drive assistant device on a driver's cab beforehand upon fabrication of the automobile, which can be easily carried by a disabled person and which can be easily fitted and adjusted to any automobile with an automatic transmission.

Means or Measures for Solving the Problems

The invention is directed to a drive assistant device for an automobile comprising a brake-pedal operating rod mechanism and an accelerator-pedal operating link mechanism, said brake-pedal operating rod mechanism having one end with a rod operation tool and the other end with brake rods pivotally connected for lateral pivotal movement to a frame which in turn is connected to a brake-pedal operation tool, said accelerator-pedal operating link mechanism comprising accelerator-pedal operating means longitudinally movably received in the brake rod of said brake-pedal operating rod mechanism, an accelerator-pedal operating lever pivoted to said accelerator-pedal operating means and extending toward the accelerator pedal, an accelerator-pedal operating link connected to said accelerator-pedal operating lever on a side away from said accelerator-pedal operating means connected thereto and having a tip end with an accelerator-pedal operation tool and a support link pivoted to said frame and to a laterally intermediate portion of said accelerator-pedal operating lever such that the support link may be pivotally moved in a direction in parallel with the pivotal moving direction of said brake rod, whereby the accelerator pedal is actuated via the accelerator-pedal operating lever, operating link and operation tool when said accelerator-pedal operating means is moved toward the rod operation tool, a brake pedal being actuated via said frame and brake-pedal operation tool when the brake-pedal operating rod mechanism is pushed forward.

The brake rod of the brake-pedal operating rod mechanism and the accelerator-pedal operating means received in the brake rod may be provided with a releasable ratchet mechanism which acts upon braking operation and becomes locked when the braking operation is released.

In the drive assistant device according to the invention, the brake-pedal operating rod mechanism may be provided with predetermined confining means for confining movement ranges of the brake-pedal operating rod mechanism in vertical and lateral directions.

The accelerator-pedal operating lever which connects the accelerator-pedal operating means with the accelerator-pedal operating link may be divided at a longitudinally intermediate position into two accelerator-pedal operating levers in parallel with each other, one of said two accelerator-pedal operating levers adjacent to the accelerator-pedal operating link being further away from a driver seat than the other positioned adjacent to the accelerator-pedal operating means, said two accelerator-pedal operating levers being interconnected through two support links in parallel with each other.

There may be provided detection means which is turned on when the accelerator-pedal operating means reaches a pivotally-supported-by-frame side of the brake rod of the brake-pedal operating rod mechanism upon operation of the brake-pedal operating rod mechanism, arresting means for arresting the support link so as not to be moved away from the frame when said detection means is off and release means for releasing the support link to be moved away from the frame when the detection means is on.

There may be provided tensile means between the support link and the frame, said tensile means adapted to urge the accelerator-pedal operating means via the accelerator-pedal operating lever toward the detection means on the brake rod on its pivotally-supported-by-frame side so as to retain said detection means on.

The automobile may be of the type having an automatic transmission and having no clutch pedal.

Effects of the Invention

According to a drive assistant device for an automobile of the invention, brake operating force, required to be greater than accelerator operating force, is applied by a brake-pedal operation tool directly fitted over the brake pedal. The brake operating force, therefore, acts only on the brake-pedal operating rod mechanism and is transmitted through the brake-pedal operating rod mechanism and the support link to the brake-pedal operation tool. An accelerator-pedal operating link mechanism of the invention, which suffices to merely bear up against the accelerator operating force which is not required to be great, can be substantially light in weight and small in size in comparison with those of the conventional devices.

In the device according to the invention, the brake pedal is substantially adjacent to a longitudinal axis of a steering shaft so that there is no substantial difference in maneuverability between one-handed operation by right hand and that by left hand. The fact that there is no difference in position of brake and accelerator pedals between automobiles with left- and right-hand steering wheels with respect to the axis of the steering shaft contributes to using the device according to the invention as it is in common in the automobiles with left- and right-hand steering wheels.

The accelerator-pedal operating force is smaller than the brake-pedal operating force. Moreover, the operation reaction force from the accelerator pedal that acts on the brake pedal is in a direction of drawing back the brake pedal, so that this force merely serves to increase the force acting on brake pedal stopper and is utterly harmless to the action of the brake. Influence on the brake pedal by inertia force of the device according to the invention occurring due to movement of an automobile is practically negligible since resultant of the inertia force of the device of the invention, which can be made small in size and light in weight, with the above-mentioned operation reaction force of the accelerator pedal is at most within a range of urging force of the return spring for abutting the brake pedal to its stopper.

According to the drive assistant device of the invention, the braking operation causes the brake to be locked to its operative condition by the ratchet mechanism, which can be easily released by the release lever. Thus, upon temporally stoppage during uphill driving, there is no need of purposely operating a parking brake; smooth start can be made by coupled operations of drawing the accelerator operating lever and releasing the brake-pedal operating rod mechanism.

According to a drive assistant device for an automobile of the invention, vertical and lateral pivotal movements of the brake-pedal operating rod mechanism are confined in a pre-determined range, so that for example when the driver loses his/her balance, he/she can use the brake-pedal operating rod mechanism as a support. Moreover, it can have an advantage that the grip can be always within reach of the driver.

According to a drive assistant device for an automobile of the invention, the accelerator-pedal operating lever may be positioned near the accelerator pedal so that the space between the accelerator-pedal operating lever and the driver seat can be retained large. This facilitates the driver's climbing up and down from the driver seat without hesitation. Moreover, it has an advantage that when the accelerator-pedal operating lever link mechanism is covered with a decorative laminate, such laminate can be compact in size.

According to a drive assistant device for an automobile of the invention, excessive stroke of the brake pedal can be coped with. As a result, excessive brake stroke due to intrusion of air bubbles in the hydraulic brake system can be coped with by increasing the stroke of the brake pedal in a practical way; thus, link interference of pushing the accelerator pedal during the operation of the brake pedal can be averted.

A drive assistant device for an automobile of the invention may be applied to any device with an automatic shift.

Thus, effects and advantages of a drive assistant device for an automobile according to the invention may be summarized as follows:

1) Upon fabrication of an automobile, there is no need of preliminarily arranging on a driver's cab a base plate or the like part of a drive assistant device for a disabled person. The drive assistant device may be easily carried by a disabled person. The drive assistant device may be fitted and adjusted to any automobile with automatic transmission.
2) The drive assistant device of course makes it possible for a disabled person with crippled legs to drive his/her owned automobile. Moreover, where a disabled person with crippled legs is a member of salespersons using automobiles in common in a company or where he/she is a member of taxi drivers using taxicabs in common, he/she can easily drive the automobile, which results in expansion in range of activities by disabled persons with crippled legs.
3) Both in a field of rental automobiles and in a field of driving schools, disabled persons with crippled legs may easily enjoy services lust like healthy persons do.
4) The drive assistant device of the invention can be fitted to not only automobiles with right-hand steering wheels, but also those with left-hand steering wheels, so that it has fair possibility of being in great need not only in Japan but also in abroad.
5) The drive assistant device of the invention expands job categories and fields of activities of disabled persons with crippled legs, which facilitates utilization of social infrastructure for disabled persons with crippled legs as well as their advancement into workplaces.

EXPLANATION OF THE REFERENCE NUMERALS

Figure 1:
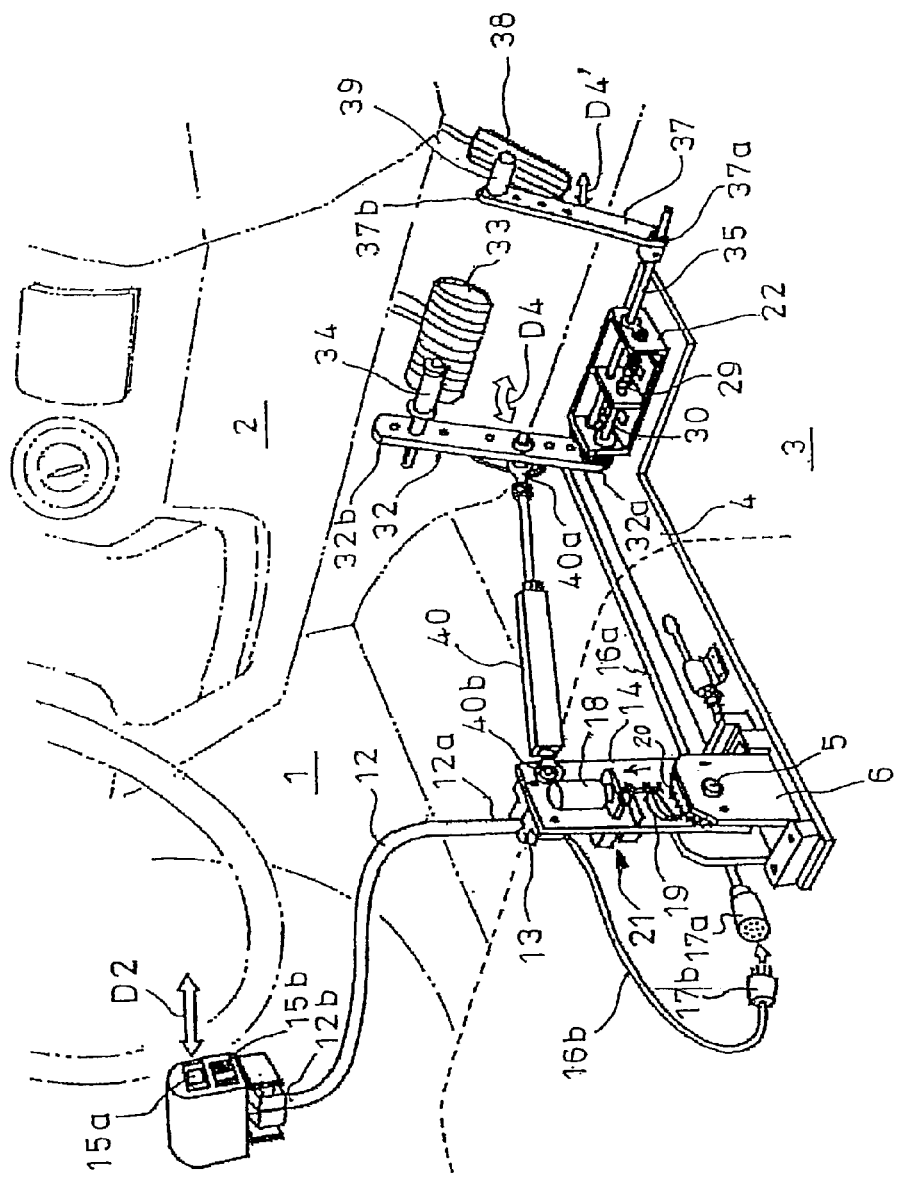
[FIG. 1] A perspective view showing a conventional drive assistant device for an automobile.
Figure 2:
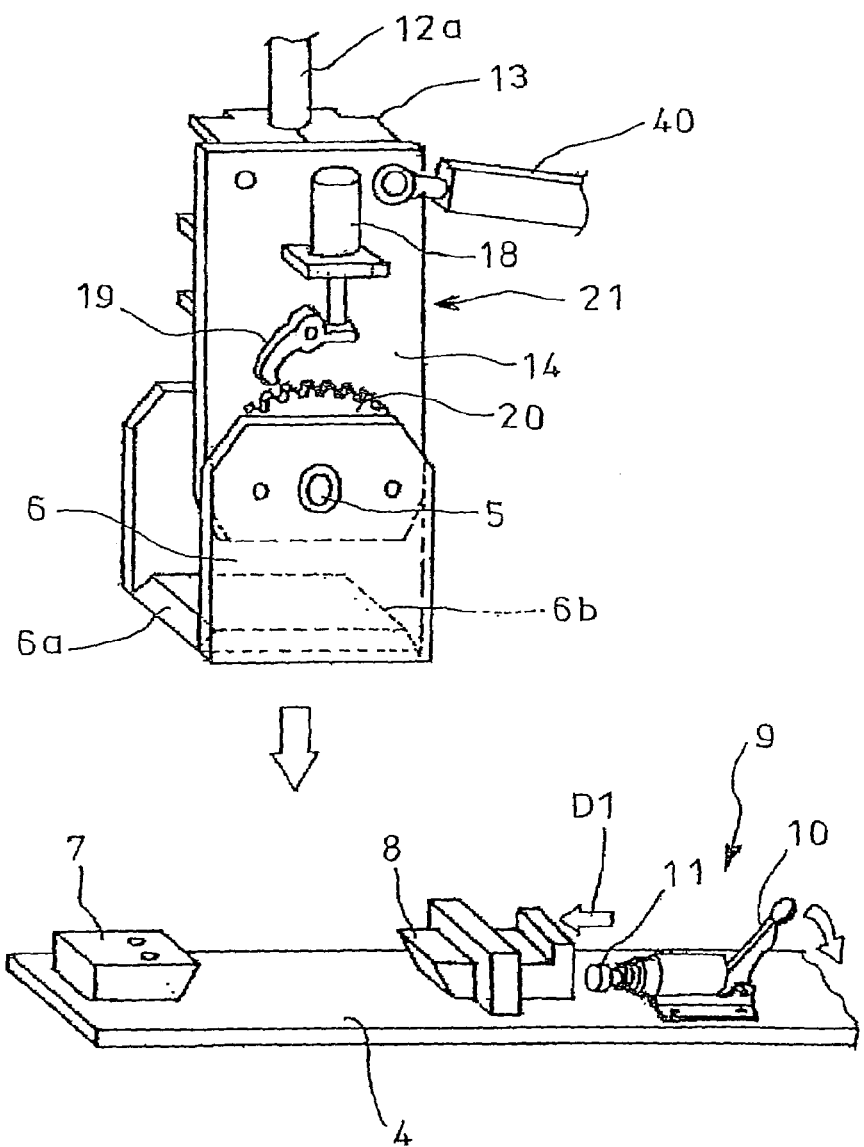
[FIG. 2] A perspective view showing a manual-operation-lever lock device and associated parts in the drive assistant device shown in FIG. 1.
Figure 3:
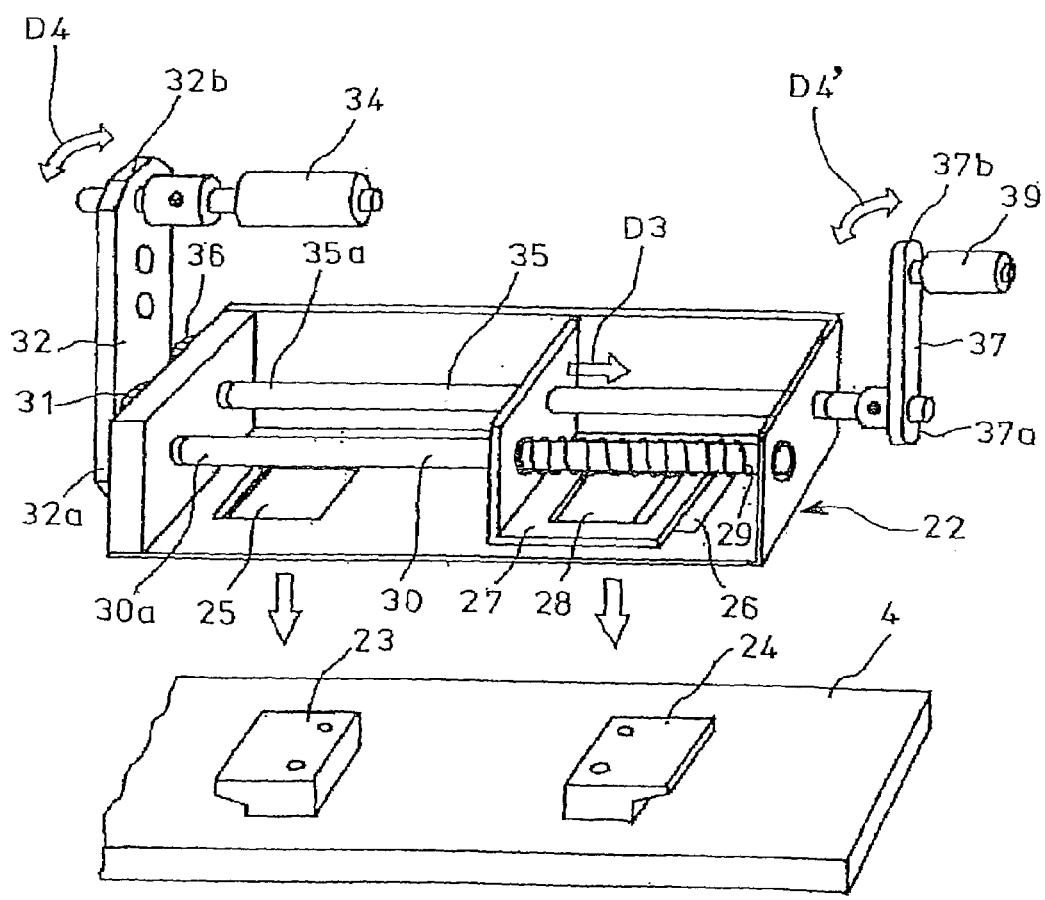
[FIG. 3] A perspective view showing a chassis and associated parts in the drive assistant device shown in FIG. 1.

51 brake pedal
53 accelerator pedal
55 drive assistant device
56 brake-pedal operating rod mechanism
57 grip (rod operation tool)
58 first brake rod (brake rod)
59 second brake rod (brake rod)
60 third brake rod (brake-pedal operating rod mechanism)
63 connecting rod (accelerator-pedal operating means)

66 accelerator-pedal operating lever
67 support link
70 frame
73 brake-pedal bracket (brake-pedal operation tool)
74 accelerator-pedal operating link
78 first link rod (accelerator-pedal operating link)
79 second link rod (accelerator-pedal operating link)
80 third link rod (accelerator-pedal operating link)
82 accelerator-pedal bracket (accelerator-pedal operation tool)
83 one-way clutch (ratchet mechanism)
83a one-way rock tooth train (ratchet mechanism)
84 pawl mechanism (ratchet mechanism)
85 pawl body (ratchet mechanism)
85a pawl (ratchet mechanism)
91 stopper (confining means)
91' stopper (confining means)
92 accelerator-pedal operating lever
93 accelerator-pedal operating lever
94 support link
97 support link
100 frame
101 switch (detection means)
102 magnet coil (release means)
106 plunger (arresting means)
109 fork (arresting means)
109a arresting piece (arresting means)
112 support link
114 helical spring (tensile means)

BEST MODE FOR CARRYING OUT THE INVENTION

An embodiment of the invention will be described in conjunction with attached drawings. In the description hereinafter, the words right, left, front and rear are with respect to a driver's posture when an automobile with an automatic transmission is moved ahead. The term "automobile with automatic transmission" includes not only an automobile with a fluid type transmission such as that with a torque converter or with a fluid coupling but also any automobile such as that with an automatic transmission comprising a belt and a pulley with a variable diameter, that with an automatic transmission suited for automatic control of a geared transmission and a mechanical clutch and that with interconnected fluid and mechanical transmissions for automatic gearshift operation and requiring no clutch pedal. With an exception of automobiles with extremely light in weight, it is a matter of course in Japan and overseas that a brake assistor is provided for reduction of brake operating force, which causes the brake-pedal operating force to be relieved to an extent that comfortable driver's driving is assured. A drive assistant device for an automobile according to the invention has an assumption that such brake assistor, required for assured comfortable driving operation, is installed.

FIGS. 4-9 show an embodiment of a drive assistant device for an automobile according to the invention. In the figures, reference numeral 51 denotes a brake pedal for the automobile; 52, a lever for the brake pedal 51; 53, an accelerator pedal; 54, a lever for the accelerator pedal 53; 55, a drive assistant device adapted to be fitted to the pedals 51 and 53; and 56, a brake-pedal operating rod mechanism for the drive assistant device 55.

Figure 4:
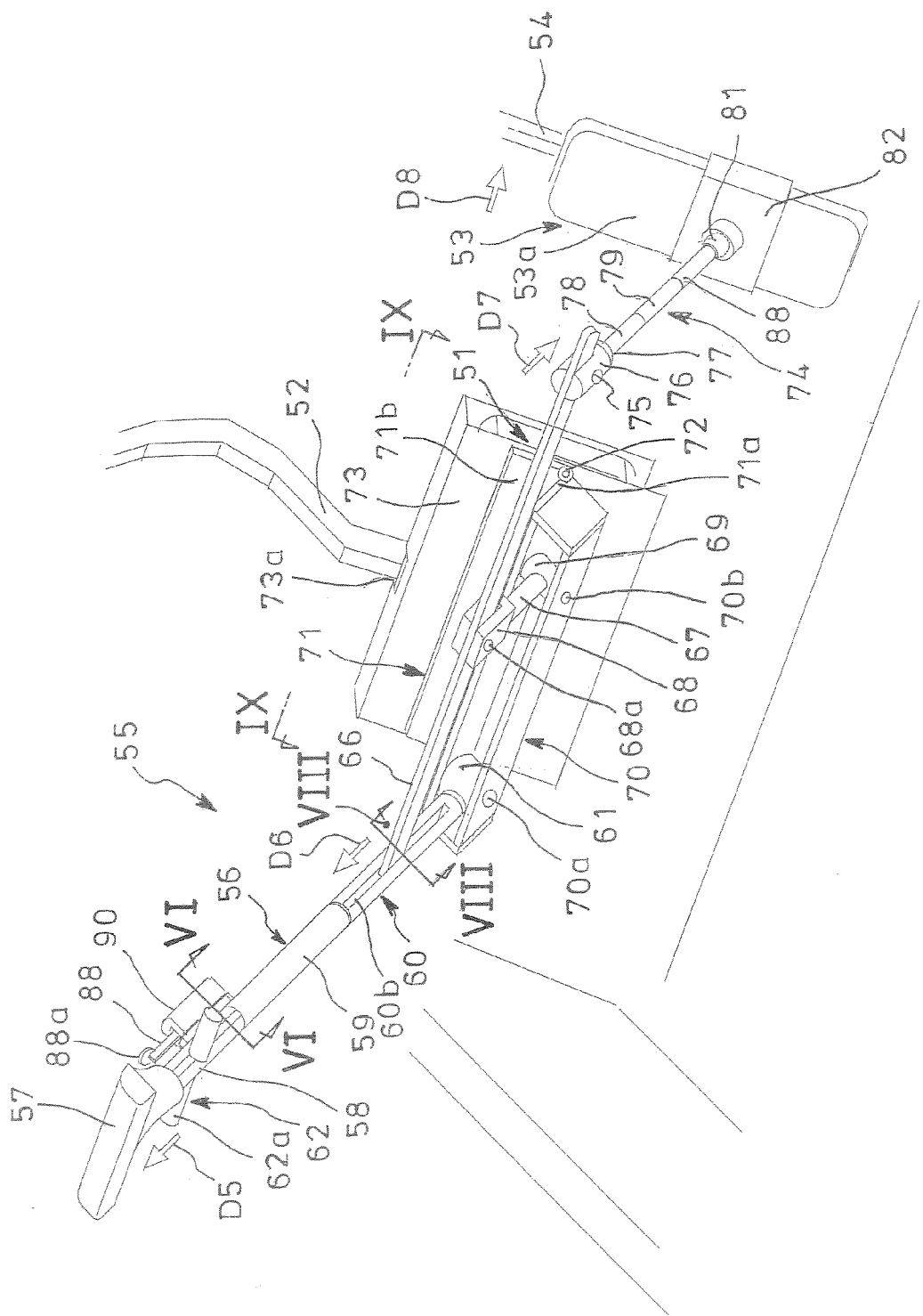
[FIG. 4] A perspective view showing an embodiment of a drive assistant device for an automobile according to the invention.

In FIG. 4, the brake-pedal operating rod mechanism 56 is provided at its left upper near side (driver side) with a grip 57 which may be always gripped by the driver in his/her hand Reference numeral 58 designates a first brake rod formed, at its end adjacent to the grip 57, with an external thread 58a which is engaged with an internal thread (not shown) formed on the grip 57 at its end adjacent to the first brake rod 58. Thus, the grip 57 is connected with the first brake rod 58 by engaging the internal thread of the former with the external thread 58a of the latter.

Reference numeral 58b denotes splits extending diametrically oppositely and axially of the first brake rod 58 from a lower end of the rod to a position adjacent to the external thread 58a; 58c, an external thread formed on the first brake rod 58 at a lower end thereof; and 59, a second brake rod in the form of a relatively thick pipe with internal threads 59a and 59b at its opposite ends. One of the threads 59a and 59b is a right-handed thread and the other, a left-handed thread. Thus, the first brake rod 58 is connected with the second brake rod 59 by engaging the external thread 58c of the former with the internal thread 59a of the latter.

Reference numeral 60 denotes a third brake rod formed at its upper end with an external thread 60a to be engaged with the internal thread 59b on the second brake rod 59; and 60b, splits extending diametrically oppositely and axially of the third brake rod 60 to an upper end of the rod from a position adjacent to a swelling or boss 61 fixed to a lower end of the rod 60. The boss 61 is provided at its center with a joint-pin through hole 61a. Thus, the grip 57 and the first and second brake rods 58 and 59 and the third brake rod 60 with the boss 61 provide a brake-pedal operating rod mechanism 56.

Reference numeral 62 denotes an accelerator control lever comprising a substantially reversed T-shaped metal fitting 62c with left and right lever portions 62a made of wood or resin, three set-screw through holes 62b being formed on the metal fitting 62c. Reference numeral 63 designates a connecting rod with I-shaped section having larger upper and lower flanges and web therebetween. The web is cut out at an upper end of the connecting rod 63, and the corresponding portions of the flanges thus with no web therebetween are formed with threaded holes 63a. Thus, the metal fitting 62c of the lever 62 is fitted into the web-free portion of the connecting rod 63, and screws 64 are passed through the holes 63a and 62h and engaged with the threaded holes 63a, whereby the accelerator control lever 62 is fixed through the fitting 62c to the upper end of the rod 63.

The web is also cut out at a lower end of the rod 63, and the corresponding portions of the flanges with no web are formed with holes 63b for a pin 65a to be engaged with a nut 65b.

Reference numeral 66 denotes an accelerator-pedal operating lever extending via a substantially vertically central portion of the split 60b of the rod 60 to the right in FIG. 4 and its tip end is located to face a tread 53a of the accelerator pedal 53. The operating lever 66 is formed with a joint hole 66a at its left end to be connected with the lower end of the connecting rod 63 and is also formed with a joint hole (not shown) at its right end.

Reference numeral 67 denotes a support link provided at its upper end with a jaw joint 68 having a through hole 68a for a pin. The link 67 is provided at its lower end with a swelling or boss 69 formed with a through hole (not shown) for a pin.

Reference numeral 70 denotes an upwardly opened rectangular-box-shaped frame; 71, a hinge comprising two metal plates 71a and 71b and pivotal about a rotary axis 72 at a connection between the plates 71a and 71b; and 73, a downwardly opened, reversely U-shaped brake-pedal bracket having an upper portion formed with a cutout 73a on a side away from the driver. The plate 71b of the hinge 71 is fixed to the bracket 73 such that the rotary axis 72 is substantially horizontal when the bracket 73 is fitted over the pedal 51. The frame 70 is attached at its side surface to the plate 71a such that the long sides of the frame 70 is in parallel with the rotary shaft 72 of the hinge 71.

The front and back longer-side surfaces of the frame are formed with through holes 70a and 70b in the order named from left in FIG. 4 and perpendicular to the rotary shaft 72 of the hinge 71 in plan view, the holes 70a being for insertion of a joint pin into the through hole 61a of the boss 61 of the third brake rod 60, the holes 70b being for insertion of a joint pin into a through hole (not shown) of the boss 69 of the support link 67.

Reference numeral 74 designates an accelerator-pedal operating link extending from the right end of the lever 66 toward the accelerator pedal 53. The link 74 comprises a jaw joint 76 with a joint pin 75 extending through a through hole (not shown) on the right end of the lever 66, a ball joint 77, first, second and third link rods 78, 79 and 80 and a ball joint 81 mounted on the tread 53a of the pedal 53 through an accelerator-pedal bracket 82. The accelerator-pedal operating link 74 is mounted substantially in parallel with the support link 67. Thus, an accelerator-pedal operating lever mechanism is constituted by the connecting rod 63, the accelerator-pedal operating lever 66 and the support link 67 and the accelerator-pedal operating link 74.

The accelerator control lever 62 is received in the web-less upper end of the connecting rod 63 and is fixed the rod 63 such that the vertically spaced three through holes 62b of the lever 62 are aligned with the threaded holes 63a of the rod 63 and three screws 64 are inserted into the holes 63a, 62b and 63a.

The grip 57 is attached to the upper end of the first brake rod 58 by screwing and fixing the lower internal thread (not shown) of the grip 57 with the external thread 58a on the upper end of the rod 58. The accelerator control lever 62 extends through the splits 58b of the rod 58 by inserting the lever 62 from below with their laterally extending metal portions being aligned with the splits 58b. The second brake rod 59 is fitted over the connecting rod 63 from below.

The connecting rod 63 receives at its web-less lower end the left end of the lever 66 and is aligned at its holes 63b with the joint hole 66a of the left end of the lever 66, the pin 65 being passed through the holes 63b and 66a and being fixed such that the lever 66 may be pivoted about the pin.

In order that the accelerator-pedal operating lever may extend through the split 60b, the connecting rod 63 is fitted into the third brake rod 60 which is engaged at its upper end having the external thread 60a with the internal thread 59b on the lower end of the second brake rod 59 which in turn is engaged at its upper end having the internal thread 59a with the external thread 58c of the first brake rod 58. Thus, the first brake rod 58 is connected with the second brake rod 59 which is connected with the third brake rod 60.

If the threads 58c and 59a are right- or left-handed threads, then the threads 59b and 60a are set to be reverse-handed threads, i.e., left- or right-handed threads. Therefore, when the second brake rod 59 is rotated in one or the other direction, the first and third brake rods 58 and 60 are moved toward or away from each other, respectively, which enables fine adjustment in length of the brake-pedal operating rod mechanism 56. As to the whole length of the mechanism, three or four variations in length of the mechanisms lengths may be provided by preparing three or four pairs of connecting rod 63 and second brake rod 59 with different lengths.

Figure 7:
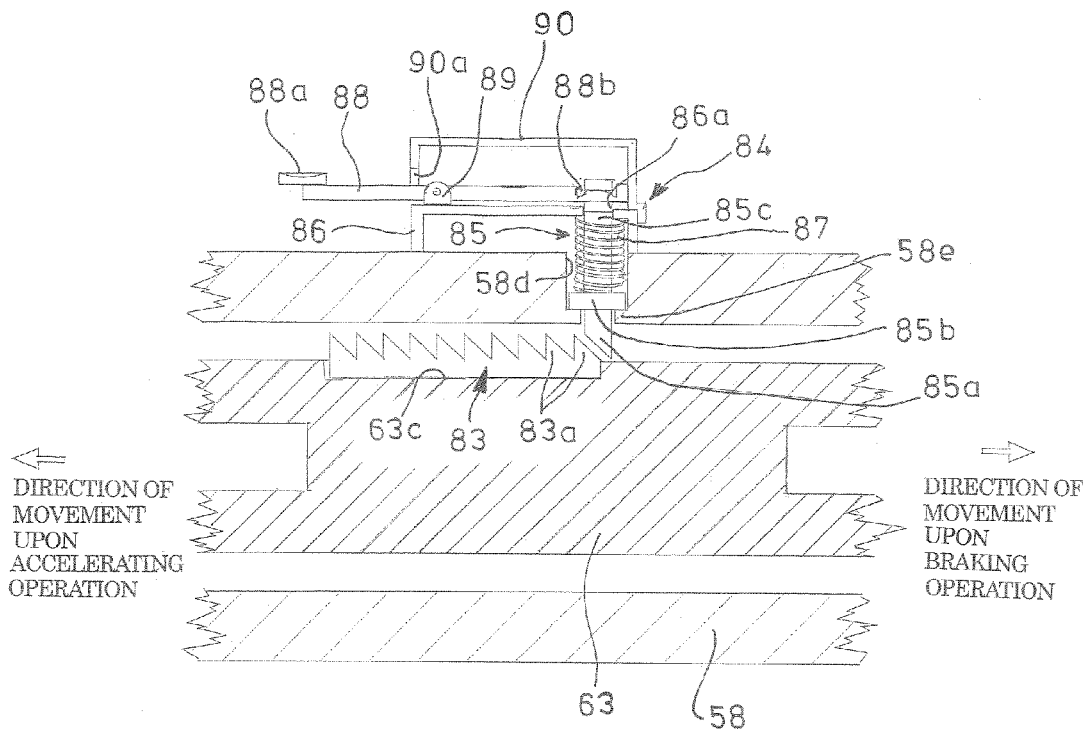
[FIG. 7] A view looking in the direction of arrows VII in FIG. 6.

As shown in FIG. 7, the connecting rod 63 is formed at its longitudinally required position with a concave 63c to which a one-way clutch 83 with a one-way rock tooth train 83a is secured in a state shown in FIG. 7. Thus upon braking and accelerating operations, the connecting rod 63 is displaced right and left in FIG. 7, respectively.

FIG. 7 shows neutral condition of the first brake rod 58 and the connecting rod 63 where no accelerating nor braking operation is conducted. Reference numeral 84 denotes a pawl mechanism comprising a pawl body 85, a helical spring 87 as an elastic recoiling body, a first cover 86 and a release lever 88.

The pawl body 85 comprises a pawl 85a, a disc-like flange 85b integrally thereon and a rod portion 85c integrally thereon in the order named from below. The first brake rod 58 is formed along its thickness with a radial through hole 58d which receives the flange 85b and rod portion 85c of the pawl body 85 with its tip being passed through a through hole 86a of a first cover 86 on an outer periphery of the rod 58. The rod portion 85c is formed with a hook hole 85d which ranges between inside and outside of the first cover 86 to extend through the rod portion 85c longitudinally of the first brake rod 58 (see FIG. 6).

The spring 87 is fitted over the rod portion 85c of the pawl body 85 so as to be positioned between the flange 85b and the first cover 86. The pawl body 85 is urged toward a hollow inside of the first brake rod 58 by the spring 87, a step of the flange 85b on its side toward the pawl 85a abutting against a step 58e on a portion of the rod 58 defining the hole 58d. The pawl 85a is set to face the one-way rock tooth train 83a of the one-way clutch 83 mounted on the connecting rod 63 inside of the first brake rod 58 (see FIG. 7).

The release lever 88 has a knob 88a on its end toward the direction of movement of the rod 63 upon accelerating operation or on its end adjacent to the grip 57 in FIG. 4. The lever 88 is pivotally supported at its longitudinally intermediate portion by a bracket 89 on the first cover 86. The lever 88 has, at its end away from the grip 57 in FIG. 4, a dent 88b engaged with the hook hole 85d of the rod portion 85c of the pawl body 85 (see FIGS. 6 and 7). Thus, pushing the knob 88a downward causes the pawl body 85 to be lifted upward against the elastic recoiling force of the spring 87 of the pawl mechanism 84 whereby when the one-way clutch 83 has been engaged with the pawl 85a, the engagement is released.

The second cover 90 is mounted on the first cover 86 and formed with an opening 90a through which the release lever 88 extends.

Figure 8:
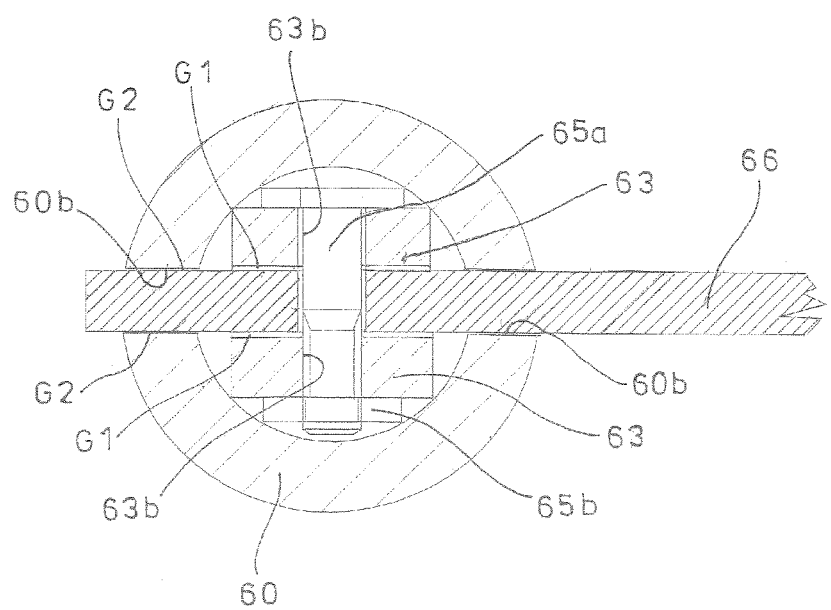
[FIG. 8] A view looking in the direction of arrows VIII in FIG. 4.

As shown in FIG. 8 in an enlarged manner, the accelerator-pedal operating lever 66 is connected to the lower end of the connecting rod 63 through a bolt-like pin 65a and a nut 65b. The pin 65a is inserted into the holes 63b on the lower flanges of the rod 63 and engaged with the nut 65b. For smooth pivotal movement of the operating lever 66, there are gaps G1 and G2 between the lever 66 and the flanges of the connecting rod 63 and between the lever 66 and the splits 60b of the third brake rod 60 respectively.

In order to accurately transmit the movement of the accelerator operating lever 62 to the accelerator-pedal operating lever 66, it is preferable to minimize gaps between an inner periphery of the third brake rod 60 and corners of the connecting rod 63.

In order to make the drive assistant device 55 economical and effective, it is preferable that a sufficient gap is provided between the second brake rod 59 and the connecting rod 63 for smooth movement of the rod 63 and that a gap between an inner periphery of the first brake rod 58 and the connecting rod 63 is assured to an extent that the ratchet mechanism with the one-way clutch 83 and pawl body 85 shown in FIG. 7 is normally operative.

Figure 9:
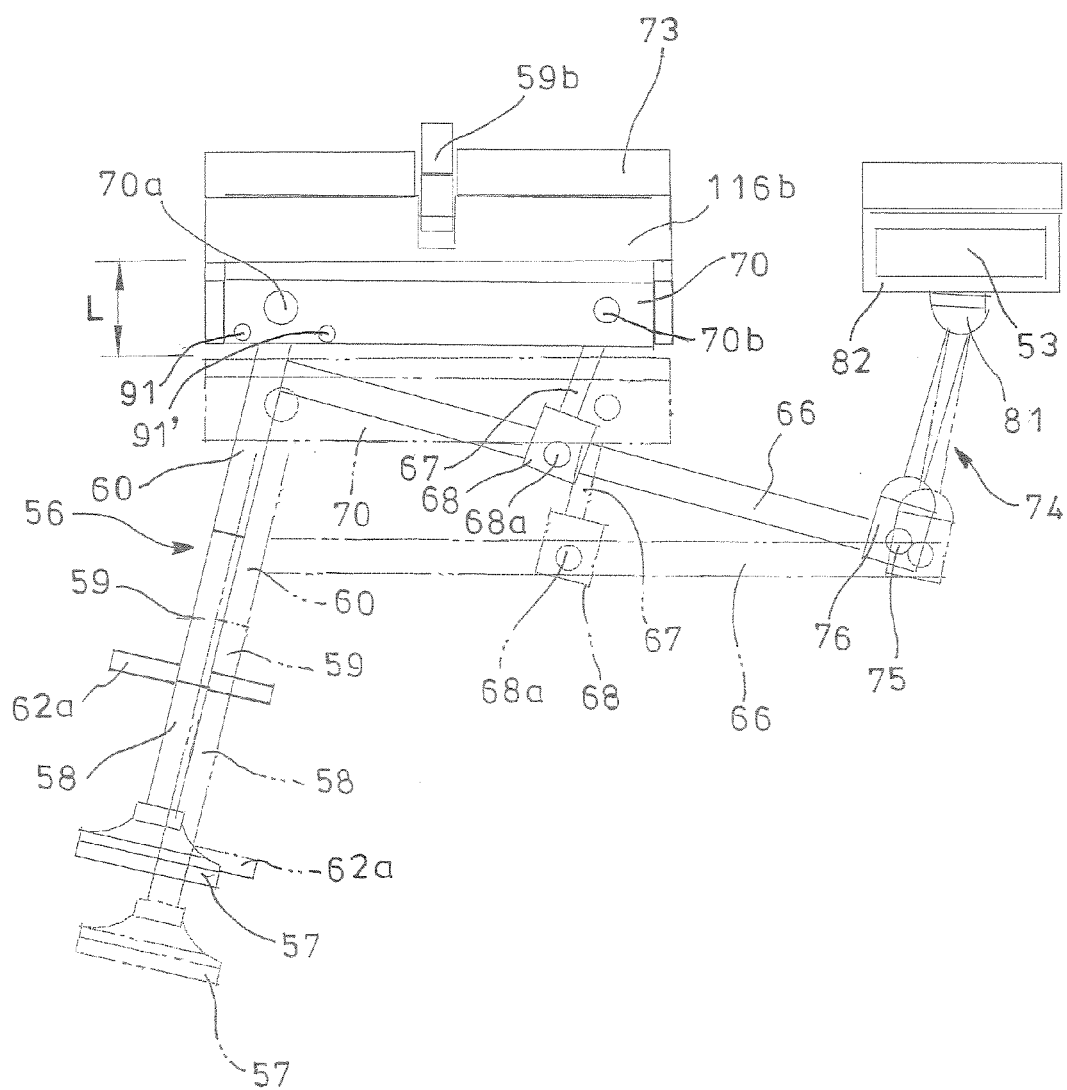
[FIG. 9] A view looking in the direction of arrows IX in FIG. 4 and showing working conditions of respective parts upon braking operation in the drive assistant device as well as positional relationship between the respective parts when the drive assistant device is operated by left hand.

The bosses 61 and 69 of the third brake rod 60 and support link 67 are assembled by coupling through the joint-pin holes 70a and 70b of the frame 70 fitted to the brake-pedal bracket 73. A reason why the frame 70 is employed is that the bosses 61 and 69 of the rod 60 and link 67 constituting the brake-pedal operating rod mechanism 56 are restricted from being axially moved by means of the opposite side surfaces of the frame 70 the bosses 61 and 69 being only allowed to be pivotally moved around the pins. In FIG. 9, reference numerals 91 and 91' denote stoppers which confine left- and right-side pivotal movements of the brake pedal operating rod mechanism. In FIG. 4 with no stoppers 91 and 91' for confinement of the left- and right-side pivotal movements being shown, a bottom of the frame 70 can serve as a stopper for confinement of downward pivotal movement.

Next, mode of operation of the above embodiment will be described.

When the drive assistant device 55 is to be used, firstly the device 55 must be fitted to the drivers cab. More specifically the brake-pedal bracket 73 of the assembled device 55 is lowered from above to be fitted over the brake pedal 51 such that the lever 52 is passed through the cutout 73a, and is fitted to the pedal 51 by screws. Similarly, the accelerator-pedal bracket 82 is lowered from above to be fitted over a predetermined portion of the accelerator pedal 53, and is fitted to the pedal 53 by screws. Further, the second brake rod 59 is rotated for adjustment in length of the brake-pedal operating rod mechanism from the grip 57 to the joint-pin holes 70a of the frame 70. After the adjustment is completed, driving is started.

Next, control of the accelerator pedal 53 will be described with respect to FIG. 4. In the state of the engine being triggered, the driver applies his/her palm on the grip 57 and hooks the levers 62a of the accelerator operating lever 62 by his/her fingers to draw the lever 62 in the direction of arrow D5. The movement of the lever 62 is transmitted via the connecting rod 63 to the left end of the accelerator-pedal operating lever 66 so that the operating lever 66 is moved in the direction of arrow D6. Thus, the operating lever 66 is swung about the pin in the pin hole 68a of the support link 67 in a clockwise direction in FIG. 4 which moves the accelerator-pedal operating link 74 in the direction of arrow D7. This movement pushes the accelerator pedal 53 in the direction of arrow D8 (forward) via the accelerator-pedal bracket 82 against elastic recoiling force of its return spring, whereby control is conducted to increase volume of fuel to be fed to an engine.

When the engine starts to rise its rotation, a parking brake (not shown) is released; then, the automobile starts running. If the accelerator operating lever 62 is drawn further, the accelerator pedal 53 is pushed further to accelerate the automobile; if the lever 62 is slacked off, the elastic recoiling force of the return spring for the accelerator pedal 53 causes the bracket 82, the operating link 74, the operating lever 66, the brake rods 60, 59 and 58, the operating lever 62 and the connecting rod 63 to be moved in the directions reverse to the directions of arrows D8-D5, respectively, whereby the revolution frequency of the engine is reduced.

Next, braking operation will be described. Imaginary lines in FIG. 9 show a neutral state with no accelerating operation nor braking operation; and solid lines, a state where the grip 57 is strongly pushed forward and obliquely downward to actuate the brake pedal 51 (see FIG. 4). To push the grip 57 forward and obliquely downward causes the brake-pedal operating rod mechanism 56 with the brake rods 58, 59 and 60 and connecting rod 63 to be also pushed forward and obliquely downward, so that the frame 70 is also pushed forward. As a result, the brake pedal 51 is pushed forward by distance L against elastic recoiling force of its spring.

Since the accelerator pedal 53 is in stationary state, pushing the grip 57 forward and obliquely downward causes the accelerator-pedal operating link 74 to be slightly swung in the clockwise direction in FIG. 9 about the ball joint 81 on the accelerator-pedal bracket 82 and causes the accelerator-pedal operating lever 66 to be swung, with the ball joint 81 on the accelerator-pedal bracket 82 standing still, about the joint pin 75 together with the support link 67 in the clockwise direction in FIG. 9 from the state shown by the imaginary lines to that shown by the solid lines, whereby the connecting rod 63 and the accelerator operating lever 62 are moved forward and obliquely downward. As a result, in FIG. 7, the connecting rod 63 is moved to the right; and the one-way rock tooth train 83a of the one-way clutch 83 is moved in the direction of movement upon the braking operation (right in FIG. 7), while pushing up the pawl body 85 through the pawl 85a, until the brake pedal 51 stops.

Even if the force to the grip 57 of the brake-pedal operating rod mechanism is released, the pawl 85a of the pawl body 85 remains positioned in the one-way rock tooth train 83a of the one-way clutch 83, so that the connecting rod 63 cannot be returned despite of the elastic recoiling force from the brake pedal 51, balancing being retained with respect to the accelerator pedal 53.

In order to release this state, the knob 88a of the release lever 88 is pushed downward to release the engagement of the pawl 85a with the one-way rock tooth train 83a, i.e., to release the ratchet mechanism. Then, the accelerator operating lever 62 and connecting rod 63 are smoothly returned depending upon a degree of releasing the force to the grip 57 and at the same time the accelerator-pedal operating lever 66 is returned to its stationary position.

The above-mentioned ratchet mechanism is effective and advantageous since, upon temporary stopping for example during uphill driving, the parking brake is difficult to operate and it is great burden for a driver to keep pushing the brake-pedal operating rod mechanism 56. Upon starting uphill driving of the automobile, the ratchet mechanism is released beforehand from its brake-lock condition and then the brake-pedal operating rod mechanism 56 is released while drawing the accelerator operating lever 62 whereby the uphill driving can be started smoothly FIG. 9 shows the positional relationship when the grip 57 is operated by left hand.

The drive assistant device for the automobile according to the embodiment of the invention shown in FIGS. 4-9 is simple in structure small in size and light in weight, so that a disabled person can freely carry with the same and can conduct its attachment and adjustment easily and in an extremely short time, which makes it possible for him/her to use in common with able-bodied drivers any automobiles such as private cars, usual business vehicles for company use and automobiles in driving schools or rental cars in his/her journey.

Figure 10:
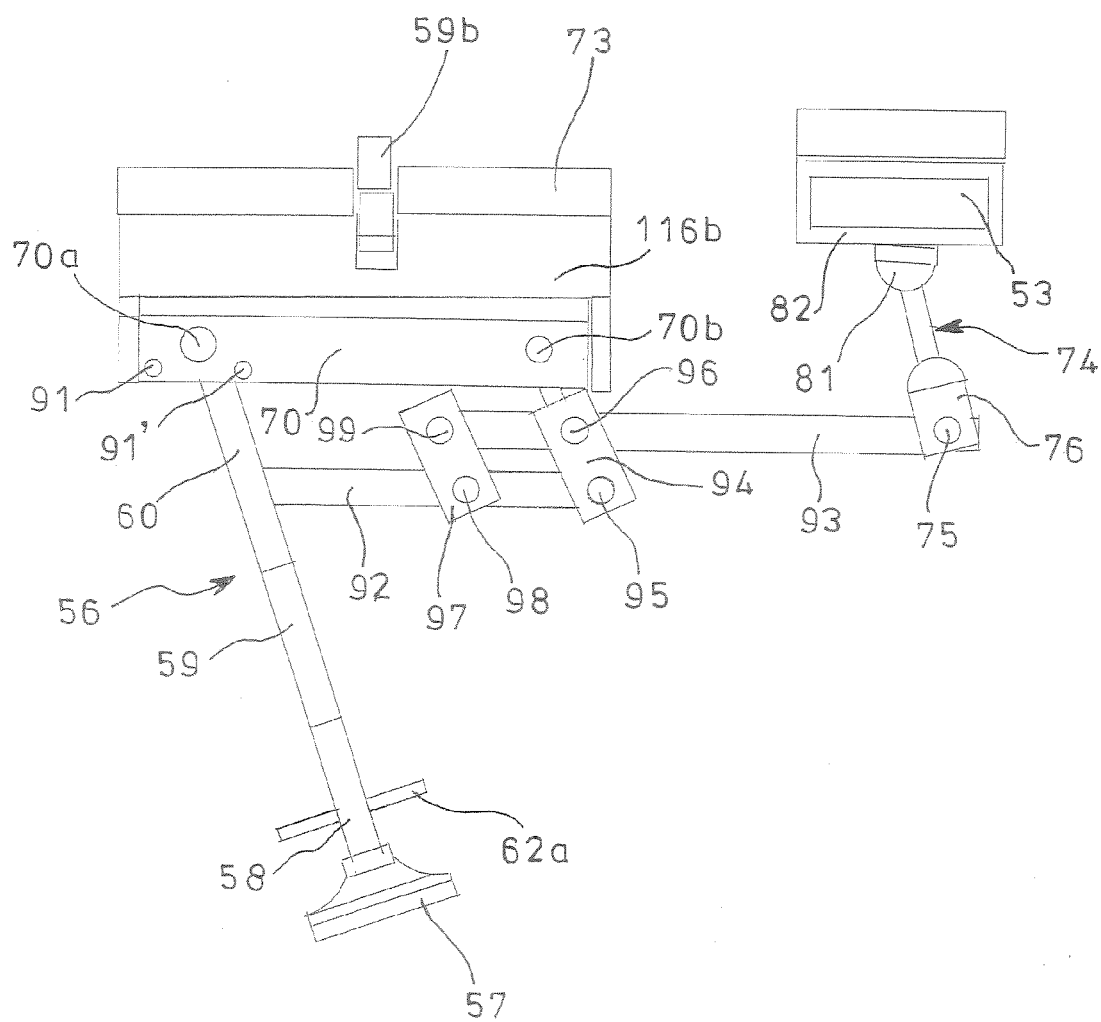
[FIG. 10] A view corresponding to the view looking in the direction of arrows IX in FIG. 4 to show a modification of an accelerator-pedal operating lever in the drive assistant device, showing working conditions of respective parts upon braking operation of the drive assistant device as well as positional relationship between the respective parts when the drive assistant device is operated in right hand.

FIG. 10 is a view showing a modification of the accelerator-pedal operating lever in a drive assistant device for an automobile according to the invention positional relationship shown being that for operating the grip 57 by right hand. Such positional relationship is dependent upon the fact that the brake pedal is positioned adjacent to or slightly left from an longitudinal axis of a steering shaft, not eccentrically positioned to one side.

Figure 5:
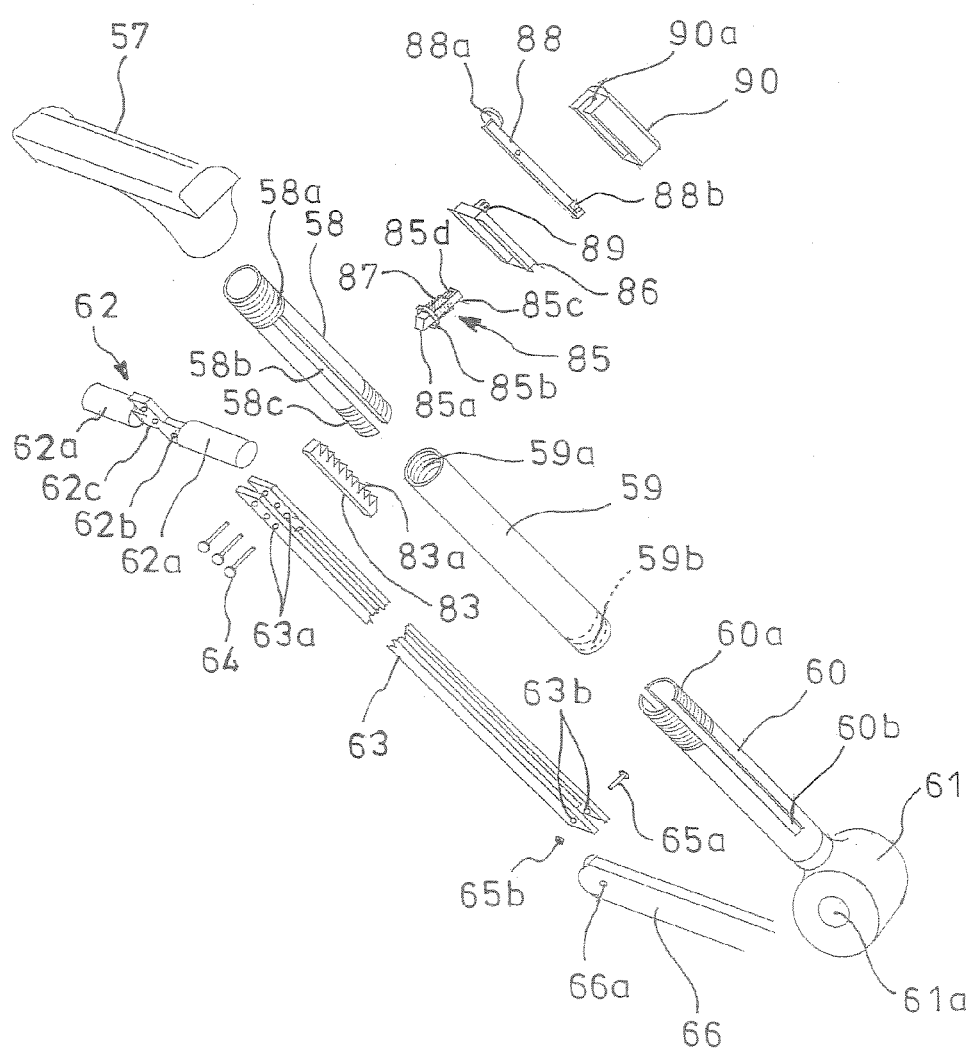
[FIG. 5] An exploded perspective view of a brake-pedal operating rod mechanism shown in FIG. 4.
Figure 6:
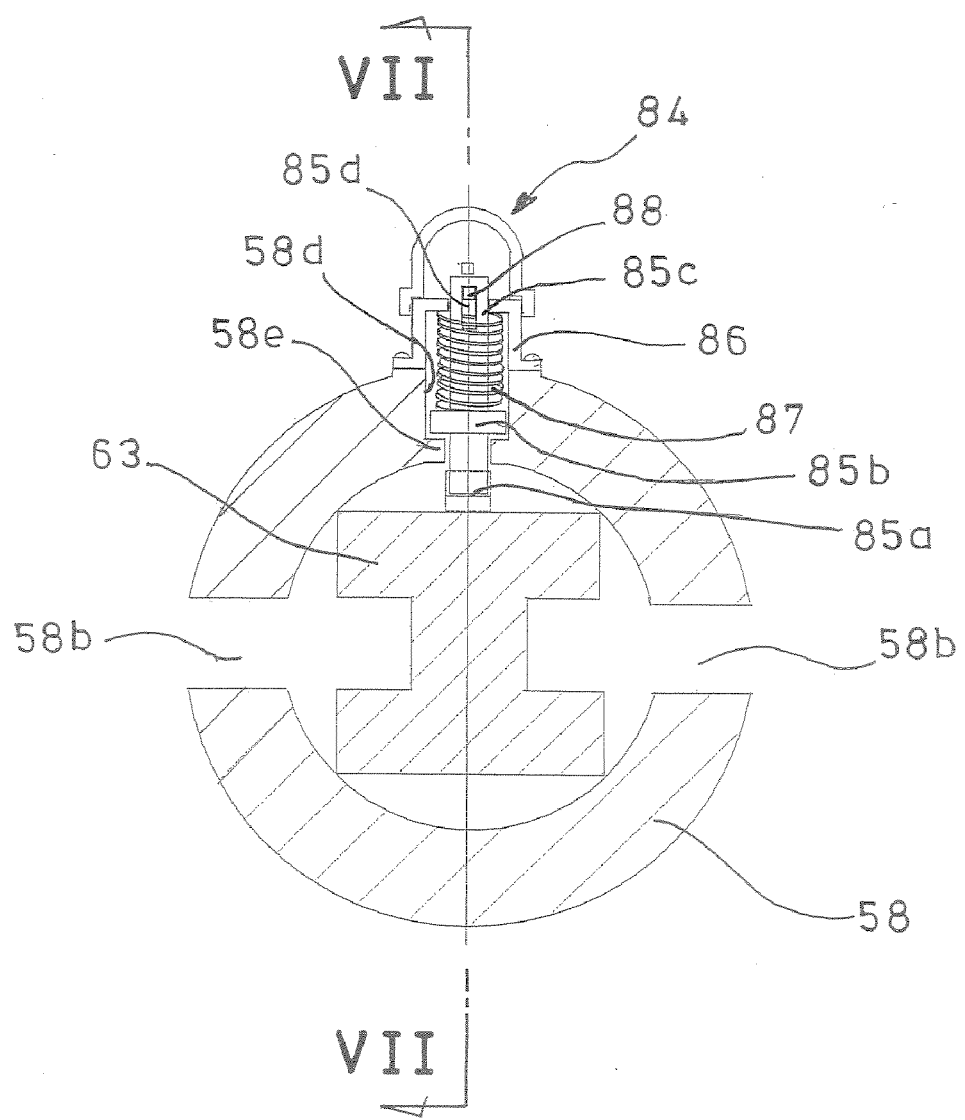
[FIG. 6] A view looking in the direction of arrows VI in FIG. 4.

In FIG. 10, a mechanism is shown which allows the accelerator-pedal operating lever to approach further toward right side with respect to the accelerator pedal 53 than the operating lever 66 shown in FIGS. 4, 5 and 9 while attaining the effects and advantages utterly same as those disclosed in the above with respect to the above-mentioned embodiment. More specifically, the accelerator-pedal operating lever 66 shown in FIGS. 4, 5 and 9 is longitudinally divided into two parallel accelerator-pedal operating levers 92 and 93 which are relatively movably interconnected by two support links 94 and 97 through pin joints 95, 96, 98 and 99, whereby a parallelogram linkage is constituted by the operating levers 92 and 93 and support links 94 and 97. The support link 94 is connected to the frame 70.

Such construction makes it possible to position the accelerator-pedal operating lever 93 forward so that enough space is assured around the driver's seat adjacent to an inlet to the driver's cab, which facilitates the driver's access to the driver's cab. Moreover, the accelerator-pedal bracket 82 can be fitted over the accelerator pedal 53 a relatively compact manner.

In general, intrusion of air into a hydraulic brake system may cause a stroke of a brake pedal to be increased depending upon volume of the air existing in the form of air bubbles. The above-mentioned drive assistant device fully functions, provided that the hydraulic brake system is normally in operation. However, there may be a fear that excessive movement of the brake pedal beyond its normal limitation may cause the accelerator pedal to be moved toward fuel increase.

Figure 11:
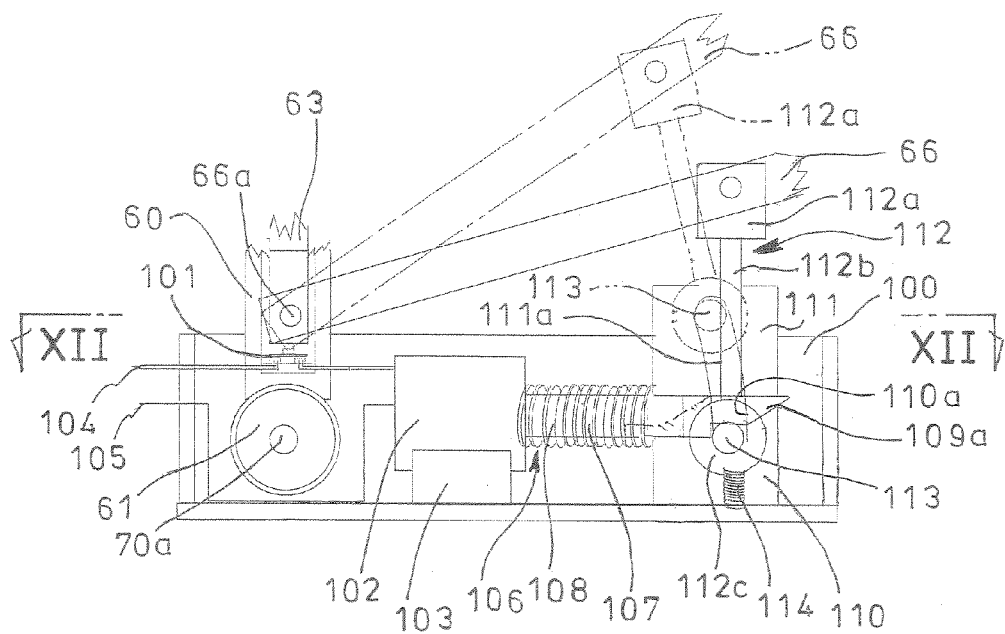
[FIG. 11] An elevation view in section of an embodiment of a box-shaped frame in the drive assistant device according to the invention which can cope with excessive stroke of the brake pedal.
Figure 12:
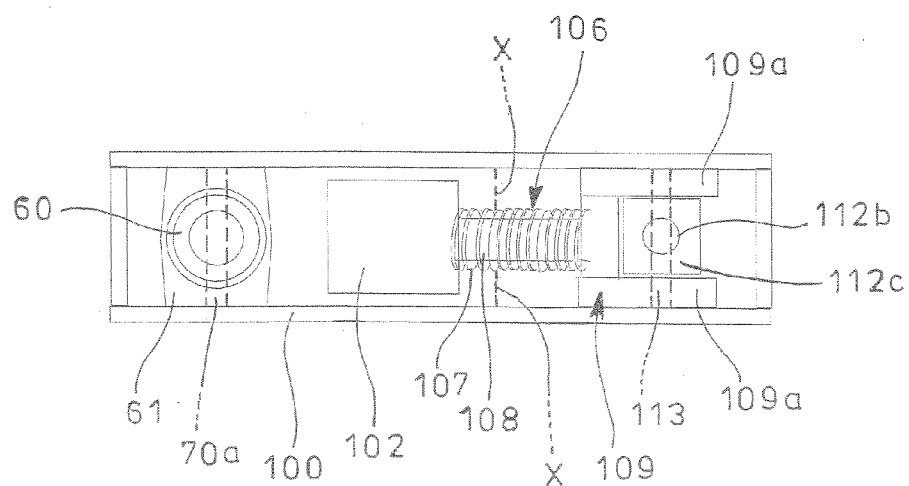
[FIG. 12] A view looking in the direction of arrows XII in FIG. 11.

FIGS. 11 and 12 show a drive assistant device for an automobile of the invention adopted to cope with excessive stroke of the brake pedal. A frame 100 corresponding to the above-mentioned frame 70 is provided with an added mechanism for coping with the excessive stroke of the brake pedal.

The frame 100 is mounted to the brake-pedal bracket 73 (see, for example, FIG. 4) via the hinge 71 shown in FIG. 4 similarly to the above embodiment. In the description hereinafter, FIGS. 4-9 are also referred to as needs demand.

In FIGS. 11 and 12, appearance of the frame 100 is same as that of the frame 70. Reference numeral 101 denotes a switch which is arranged on an insulating material on a bottom of the third brake rod 60 adjacent to the boss 61 so as to face the lower end of the connecting rod 63; and 102, a magnet coil which is fixed via a mount 103 to a bottom plate of the frame 100 substantially at a center of the frame.

Reference numerals 104 and 105 designate lead wires. The lead wire 104 from a power source (not shown) is connected via the switch 101 to the magnet coil 102 while the lead wire 105 from the power source (not shown) is directly connected to the magnet coil 102. Reference numeral 106 denotes a plunger urged to the right in the figure by a helical spring 107 fitted over the same.

The plunger 106 comprises a rod 108 over which the helical spring 107 is fitted, and a fork 109 on a tip of the rod 108 and having left and right yoke pieces 109*a* Reference numerals 110 and 111 denote lower and upper guide plates paired at left and right so as to vertically support the yoke pieces 109*a*. The guide plates 110 and 111 and the yoke pieces 109*a* are substantially of same thickness. The plunger 106 is adapted to be drawn into the magnetic coil 102 irrespective of the urging force by the helical spring 107 outside when the magnet coil 102 is magnetized by electric power from the power source (not shown), resulting in movement of left ends of the yoke pieces 109*a* up to position X in FIG. 12.

Reference numeral 112 designates a support link corresponding to the above-mentioned support link 67. A jaw joint 112*a* and link 112*b* of the support link 112 are substantially same as those of the support link 67; however, a pin joint 112*c* and a joint pin 113 to be passed through a joint hole of the joint 112*c* are made different in length from those of the support link 67.

Each of the left and right lower guide plates 110 is formed with a guide groove 110*a* extending through its thickness and having a semicircular lower end. Each of the upper guide plates 111 is formed, at a position opposite to the guide groove 110*a* of the guide plate 110, with a guide groove 111*a* similarly extending through its thickness and having a semicircular upper end. These guide grooves 110*a* and 111*a* are guides through which the joint pin 113 of the support link 112 is passed to slide. Confronting inner surfaces of the guide plates 110 and of the guide plates 111 support axially opposite sides of the pin joint 112*c* of the support link 112. Arranged between the frame 100 and a lower end of the pin joint 112*c* of the support link 112 is a helical spring 114 or weak tensile spring which has an end connected to the pin joint 112*c* and the other end connected to a bottom of the frame 100 and which is adapted to draw the support link 112 downward in FIG. 11 or toward the bottom of the frame 100.

Next, in FIGS. 11 and 12, the mode of operation will be described where air intrudes into the hydraulic brake system and exists therein in the form of air bubbles and the stroke of the brake pedal is increased, reference being made also to FIGS. 4 and 9. In FIG. 11, a position of the support link 112 shown by solid lines is an ordinary position where its joint pin 113 is arrested by the semicircular bottoms of the guide grooves 110*a* and the yoke pieces 109*a* and where no air intrudes into the hydraulic brake system and no displacement amount of the brake pedal is increased.

A position of the accelerator-pedal operating lever 66 shown by solid lines is a position where, in an ordinary case of no air intruding into the hydraulic brake system and no displacement amount of the brake pedal being increased the accelerator-pedal operating lever 66 reaches its maximum position through its pivotal movement counterclockwise around the joint pin 75 of the jaw joint 76 from the state shown in FIG. 4 by pushing in the brake-pedal operating rod mechanism 56 shown in FIG. 4

Thus, when air intrudes into the hydraulic brake system and exists therein in the form of air bubbles the brake does not act even if the accelerator-pedal operating lever 66 reaches the position shown by solid lines in FIG. 11. In this case, the brake-pedal operating rod mechanism 56 shown in FIG. 4 is substantially fully pushed in for actuation of the brake pedal (see FIG. 4. Hereinafter, when FIG. 4 is to be referred to, the wording "see FIG. 4" is omitted.), the brake does not act and the switch 101 is not actuated since air has intruded into the hydraulic brake system.

Though the lower end of the connecting rod 63 is near the bottom of the third brake rod 60 in the brake-pedal operating rod mechanism 56, the switch 101 is off and the joint pin 113 of the pin joint 112*c* of the support link 112 is arrested and positioned by the semicircular bottoms of the guide grooves 110*a* of the guide plates 110 and the yoke pieces 109*a* of the fork 109 of the plunger 106 as mentioned above. Since the accelerator pedal 53 is in a stationary position, the jaw joint 76 is slightly swung as shown in FIG. 9 the accelerator-pedal operating lever 66 being in the state shown by solid lines in FIG. 11 about the joint pin 75 of the jaw joint 76.

In the above-mentioned state, the grip 57 is further pushed in to further move the brake pedal 51 forward through the frame 100 and brake-pedal bracket 73. Then, the accelerator-pedal operating lever 66 is swung slightly counterclockwise in FIG. 11 about the support link 112; as a result, the connection with the connecting rod 63 is moved toward the switch 101 in FIG. 11; finally, it pushes the switch 101 into on.

As a result, the magnet coil 102 is energized by the electric current from the power source (not shown), so that the magnet coil 102 draws the plunger 106 until the end of the fork 109 reaches the position X shown in dotted lines against the elastic recoiling force of the helical spring 107 fitted over the rod 108 of the plunger 106.

Thus, the join pin 113 of the pin joint 112c is free from the arresting so that the support link 112 is moved from the guide grooves 110a of the guide plates 110 to the guide grooves 111a of the guide plates 111 into the position shown by imaginary lines in FIG. 11. During this, the support link 112 receives tensile force from the helical spring 114 toward the bottom of the frame 100; however, the tensile force is weak so that the support link 112 is not prevented from being moved.

Displacement of the support link 112 causes the accelerator-pedal operating lever 66 to be further swung counterclockwise in FIG. 11 into the position shown in imaginary lines. Thus, the operating lever 66 is moved from its position shown by solid lines to the position shown by imaginary lines and the pin joint 112c of the support link 112 is moved to the uppermost portions of the guide grooves 110a through the joint pin 113, so that displacement amount of the brake pedal bracket 73 is increased; as a result, the brake can be surely applied even in a case where air intrudes into the hydraulic brake system and exists therein in the form of air bubbles and therefore stroke of the brake pedal is increased.

In this case, since the accelerator-pedal operating level 66 is drawn downward by the helical spring 114 through the support link 112, the operating lever 66 continues to push the switch 101. As a result, the magnet coil 102 is retained in its excited state, the plunger 106 being retained in its retracted state, the accelerator-pedal operating lever 66 being in the position shown by imaginary lines in FIG. 11. The accelerator-pedal operating lever 66 tries to push the accelerator pedal 53 through the accelerator-pedal operating link 74, but in vain since the elastic recoiling force of the accelerator pedal is so strong that, even if the accelerator-pedal operating lever 66 is swung, the accelerator pedal is not pushed into movement.

When the brake-pedal operating rod mechanism 56 is returned, in dependence of the return amount of the brake pedal 51 the joint pin 113 of the support link 112 is moved from the guide grooves 111a of the guide plates 111 toward the guide plates 110 to reach the semicircular bottom portions of the guide grooves 110a (position shown by solid lines in FIG. 11) of the guide plates 110. During this, the helical spring 114 draws the support link 112 and the accelerator-pedal operating lever 66; as a result, the switch 101 is kept pushed by the accelerator-pedal operating lever 66.

When the joint pin 113 of the support link 112 reaches the bottoms of the guide grooves 110a of the guide plates 110, tensile force by the helical spring 114 becomes ineffective; thus, the connecting rod 63 starts to move upwardly in the third brake rod 60 and away from the switch 101, so that the switch 101 becomes off. Thus, the electric current of the magnet coil 102 is shut off so that the plunger 106 is pushed back to the right in FIG. 11 by the elastic recoiling force of the helical spring 107, so that the yoke pieces 109a arrest the joint pin 113 of the support link 112. Thus, the brake becomes free from the excessive stroke and regains its original function. When the brake-pedal operating rod mechanism 56 is completely released back, the brake is released.

When the drive assistant device 55 for an automobile is to be removed from the brake and accelerator pedals 51 and 53 to be carried with, it suffices that merely the brake- and accelerator-pedal brackets 73 and 82 are detached from the pedals 51 and 53, respectively; therefore, they may be carried with for example in a bag as they are.

The drive assistant device 55 for an automobile according to the embodiment is small in shape and light in weight, so that there is no fear that the urging force of the return spring for the brake pedal 51 may become insufficient by the inertia force due to added weight of the drive assistant device fitted to the brake pedal 51a. Moreover, during operation of the accelerator pedal 53, reaction forces such as that by the return spring for the accelerator pedal 53 utterly act in the direction of increasing the urging force of the brake-pedal return spring, so that reliability in operation is good.

It is to be understood that the invention is not limited to the above-mentioned embodiments and that various changes and modifications may be made without leaving the gist of the invention. For example, applicable to the invention is any mechanical or electromagnetic mechanism which causes no force nor displacement to be transmitted, upon braking operation, from the accelerator-pedal operating link mechanism to the accelerator pedal.

The invention claimed is:

1. A drive assistant device for an automobile comprising a brake-pedal operating rod mechanism and an accelerator-pedal operating link mechanism, said brake-pedal operating rod mechanism having one end with a rod operation tool and the other end with brake rods pivotally connected for lateral pivotal movement to a frame which in turn is connected to a brake-pedal operation tool, said accelerator-pedal operating link mechanism comprising accelerator-pedal operating means longitudinally movably received in the brake rod of said brake-pedal operating rod mechanism, an accelerator-pedal operating lever pivoted to said accelerator-pedal operating means and extending toward an accelerator pedal, an accelerator-pedal operating link connected to said accelerator-pedal operating lever on a side away from said accelerator-pedal operating means connected thereto and having a tip end with an accelerator-pedal operation tool and a support link pivoted to said frame and to a laterally intermediate portion of said accelerator-pedal operating lever such that the support link may be pivotally moved in a direction in parallel with the pivotal moving direction of said brake rod, whereby the accelerator pedal is actuated via the accelerator-pedal operating lever, operating link and operation tool when said accelerator-pedal operating means is moved toward the rod operation tool, a brake pedal being actuated via said frame and said brake-pedal operation tool when the brake-pedal operating rod mechanism is pushed forward.

2. A drive assistant device for an automobile as claimed in claim 1, wherein the brake rod of the brake-pedal operating rod mechanism and the accelerator-pedal operating means received in the brake rod are provided with a releasable ratchet mechanism which acts upon braking operation and becomes locked when the braking operation is released.

3. A drive assistant device for an automobile as claimed in claim 1, wherein the brake-pedal operating rod mechanism is provided with predetermined confining means for confining movement ranges of the brake-pedal operating rod mechanism in vertical and lateral directions.

4. A drive assistant device for an automobile as claimed in claim 1, wherein the accelerator-pedal operating lever for connecting the accelerator-pedal operating means with the accelerator-pedal operating link is divided at a longitudinally intermediate position into two accelerator-pedal operating levers in parallel with each other, one of said two accelerator-pedal operating levers adjacent to the accelerator-pedal operating link being further away from a driver seat than the other adjacent to the accelerator-pedal operating means, said two accelerator-pedal operating levers being interconnected through two support links in parallel with each other.

5. A drive assistant device for an automobile as claimed in claim 1, wherein there are provided detection means which is turned on when the accelerator-pedal operating means reaches a pivotally-supported-by-frame side of the brake rod of the brake-pedal operating rod mechanism upon operation of the brake-pedal operating rod mechanism, arresting means for arresting the support link so as not to be moved away from the frame when said detection means is off and release means for releasing the support link to be moved away from the frame when the detection means is on.

6. A drive assistant device for an automobile as claimed in claim 5, wherein there is provided tensile means between the support link and the frame, said tensile means adapted to urge the accelerator-pedal operating means via the accelerator-pedal operating lever toward the detection means on the brake rod on its pivotally-supported-by-frame side so as to retain said detection means on.

7. A drive assistant device for an automobile as claimed in claim 1, wherein the automobile is of the type having an automatic transmission and having no clutch pedal.

* * * * *